US006845586B1

(12) United States Patent
Brock, IV

(10) Patent No.: US 6,845,586 B1
(45) Date of Patent: Jan. 25, 2005

(54) MOTION SYSTEM FOR DECOYS

(76) Inventor: Robert C. Brock, IV, 108 Crossover Ave., Suite G, Lowell, AR (US) 72745

( * ) Notice: Subject to any disclaimer, the term of this patent is extended or adjusted under 35 U.S.C. 154(b) by 0 days.

(21) Appl. No.: 09/599,914

(22) Filed: Jun. 22, 2000

Related U.S. Application Data

(63) Continuation of application No. 09/412,961, filed on Oct. 13, 1999, now Pat. No. 6,079,140.

(51) Int. Cl.[7] ............................................. A01M 31/06
(52) U.S. Cl. ................................................... 43/3; 43/2
(58) Field of Search .......................................... 43/2, 3

(56) References Cited

U.S. PATENT DOCUMENTS

| | | | |
|---|---|---|---|
| 2,457,295 A | 12/1948 | Woodhead ........................ 43/3 |
| 2,547,286 A | 4/1951 | Sabin ............................... 43/3 |
| 2,624,144 A | 1/1953 | Beverman ........................ 43/3 |
| 2,793,456 A | 5/1957 | Argo ................................ 43/3 |
| 4,375,337 A | 3/1983 | Yerger ........................ 366/343 |
| 4,422,257 A | 12/1983 | McCrory ......................... 43/3 |
| 4,535,560 A | 8/1985 | O'Neil ............................ 43/3 |
| 4,612,722 A | 9/1986 | Ferrell ............................. 43/3 |
| 5,036,614 A | 8/1991 | Jackson ........................... 43/3 |
| 5,074,071 A | 12/1991 | Dunne ............................. 43/3 |
| 5,168,650 A | 12/1992 | Martin ............................. 43/3 |
| 5,377,439 A | 1/1995 | Roos et al. ...................... 43/3 |
| 5,515,637 A | 5/1996 | Johnson .......................... 43/2 |
| 5,566,491 A | 10/1996 | Phillips .......................... 43/3 |
| 5,862,619 A | 1/1999 | Stancil ........................... 43/3 |
| 5,974,720 A | * 11/1999 | Bowling .......................... 43/3 |
| 6,079,140 A | 6/2000 | Brock, IV ....................... 43/3 |
| 6,092,323 A | * 7/2000 | McBride et al. ................. 43/3 |
| 6,138,396 A | * 10/2000 | Capps ............................. 43/3 |

* cited by examiner

Primary Examiner—Kurt Rowan
(74) Attorney, Agent, or Firm—Head, Johnson and Kachigian

(57) ABSTRACT

The motion system includes a frame to which a decoy or decoys are secured. The frame is then deployed beneath the surface of the water in the target area. The frame is thus suspended by the floating decoy or decoys beneath the surface. In one exemplary embodiment, the frame forms a parallelepiped structures. The parallelepiped structure may have a square or rectangular or other type of parallagram cross-sectional outline. In another exemplary embodiment, the frame may form a collar with pivoting legs. The frame also includes a mounting system for a motor. In one embodiment, the mounting system comprises an internal brace extending between opposite sidewalls. The brace may alternatively extend diagonally between opposing corners from a single sidewall. In another embodiment, the brace is formed by the frame itself. The brace secures the motor to the frame. The motor may be fixed or mounted in a pivotal configuration. When fixed, the longitudinal axis of the motor is transverse to the horizontal plane established by the frame. When pivotal, the motor pivots between a position in alignment with the horizontal plane and transverse thereto.

2 Claims, 5 Drawing Sheets

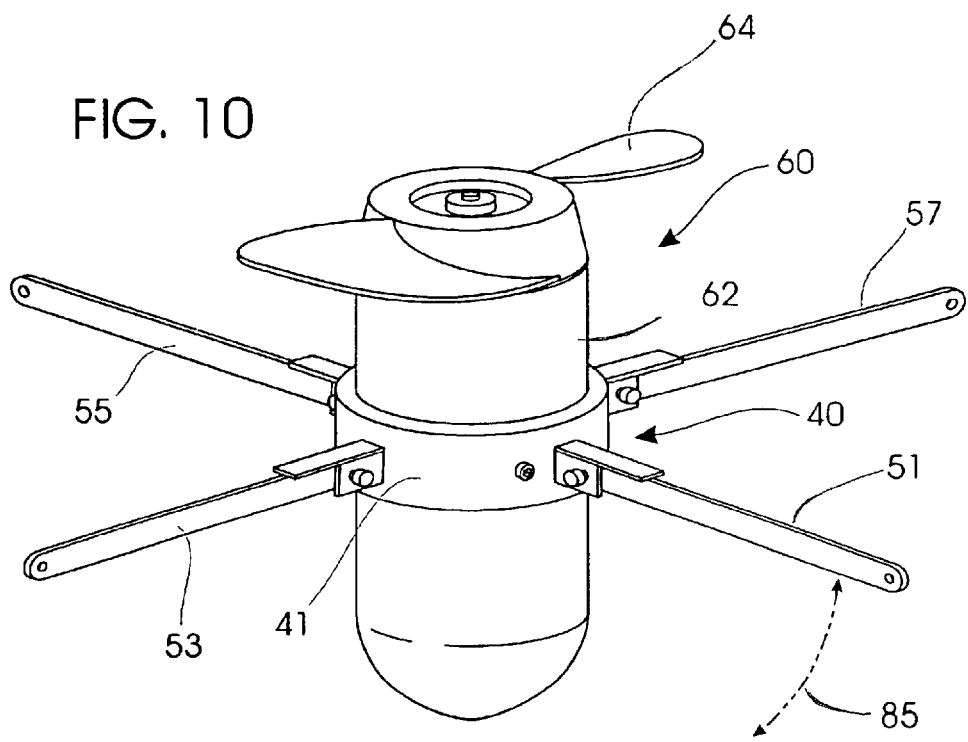

MOTION SYSTEM FOR DECOYS

CROSS-REFERENCE TO RELATED APPLICATIONS

This application claims the benefit of and is a continuation of U.S. patent application, Ser. No. 09/417,961, filed Oct. 13, 1999 now U.S. Pat. No. 6,079,140.

BACKGROUND OF THE INVENTION

The present invention relates to a system for moving decoys. More particularly, the invention relates to a system for animating floating decoys of the type used to attract waterfowl and the like. The invention especially relates to a system for simultaneously animating several decoys to create a natural environment to attract game.

One of the principle difficulties for duck hunters when attracting game is to create and/or maintain a site that appears natural and thus inviting to the potential game. For this reason, blinds and/or other concealment devices are carefully constructed to blend into the landscape to hide the hunter. A common practice of many hunters is to place floating decoys in the vicinity of the blind to enhance the natural appearance of the area. It is also not uncommon for a plurality of decoys (i.e. a decoy spread to be deployed immediately adjacent the hunter's blind. Typically, duck hunters may employ as many as 10 to 20 decoys while geese hunters employ especially large numbers of decoys (i.e. sometimes hundreds).

Conventional decoys typically include a unitary buoyant body. One such conventional duck decoy is shown in U.S. Pat. No. 5,168,650. The device includes a floating decoy with a buoyant body and an anchor connected to the body by a cord. The anchor holds the decoy in place on the body of water while the still and lifeless decoy floats thereupon to attract game. While great strides have been made in the physical appearance of decoys, a significant problem of animating the decoys so that they more accurately simulate living ducks remains.

Various attempts at animating individual decoys have been proposed with little practical success. For example, U.S. Pat. No. 4,612,722 shows a waterfowl decoy that is motorized to randomly move in response to propeller activation. This decoy has significant additional structures, including a keel and rudder, that are not typically present upon conventional decoys.

U.S. Pat. No. 5,377,439 shows a remote controlled floating decoy that is both self-propelled and that has moving body parts. This decoy has a buoyant body resembling a game bird with an internal receiver, propulsion system and rudder. The receiver is responsive to commands from a transmitter and provides electrical control signals to a plurality of servomechanisms and associated linkages in response to the commands. The propulsion system and rudder are also responsive to the commands to enable a user to control the decoy to provide directed locomotion. This decoy is also not a conventional decoy in that it is substantially more complex and structurally different than a conventional decoy.

U.S. Pat. No. 5,515,637 shows a decoy that is animated by the wind. The decoy is mounted upon a rod. The decoy swings about the rod like a weather vane to simulate natural body and head lateral and frontal movements and to tilt when a mild breeze impinges on the body of the decoy. These types of decoys are also not structurally similar to conventional decoys.

U.S. Pat. No. 5,862,619 shows an animated waterfowl decoy with structures that imitate the appearance of moving wings. The decoy has a rotating vane with a light and dark side. The rotation of the vane produces the appearance of symmetrical lateral movement to simulate the flapping of a bird's wings. Again, this device is not structurally similar to conventional decoys.

U.S. Pat. No. 5,036, 614 shows an animated bird decoy including a body with a pivoting mechanism mounted therein. The pivoting mechanism pivots the body relative to a support assembly inserted into the earth. The device requires modification of the decoy body to insert the pivoting mechanism therein and is more complex than a conventional decoy.

Instead of animating a single decoy, some devices have been proposed that animate several decoys simultaneously by water movement or the like. For example, U.S. Pat. Nos. 4,375,337 and 5,566,491 are adapted to disturb water to create ripples that in turn cause decoy motion. The decoy motion is intended to attract game.

Still other attempts have been made to animate multiple decoys by providing motor devices connected to several decoys to move the connected decoys simultaneously. For example, U.S. Pat. Nos. 4,422,257 and 4,535,560 both show devices for simultaneously moving multiple decoys. Both of these devices are adapted to move the decoys on top of the water and require elaborate structures. In particular, U.S. Pat. No. 4,422,257 uses a carousel structure mounted above the water that can be seen by approaching game. U.S. Pat. No. 4,535,560 uses a complex underwater structure requiring multiple anchors and a remote power source. Thus, significant portions of the invention must be installed underwater.

The known art thus teaches decoy movement on the water surface. Such movement is desirable in that it further convinces approaching game animals of the safety of the hunting area while permitting the hunters to remain undetected. However, the known art fails to provide an effective and easily deployable method for attracting game to a hunting area that adequately animates multiple decoys to enhance the desirability of the area.

BRIEF SUMMARY OF THE INVENTION

The present invention effectively and efficiently simulates natural activities of game, particularly waterfowl, including movement and feeding. The present invention animates decoys to simulate feeding and it can also be used to create ripples on the surface of the water, which in turn cause nearby decoys in a decoy spread to also move in response thereto. This activity creates an effect (i.e. movement of the decoys) similar to that created by the known art with respect to water movement while adding the simulation of feeding as well.

The present invention provides a system for simultaneously animating several decoys or a decoy spread to attract game, such as waterfowl and the like, to a hunting area. The system further increases the likelihood that the desired game or victims will be drawn into the hunting or target area by actively promoting the desirability of the area. In particular, the motion system of the present invention enables the hunter to simultaneously animate several decoys to simulate the natural feeding activities of waterfowl, particularly ducks and geese.

Conventional duck decoys and decoy spreads often attract suitable numbers of game to the target area. The conventional decoys accomplish this by promoting the potential desirability of the area by depicting a serene (and therefore "safe") environment for the victim. The present invention also attracts game by promoting the desirability of the area through the instinctive need to feed.

This aspect of the present invention addresses an area largely ignored by the known art. That is, while the known art generally attempts to lure game into the target area by promoting the safety and serenity of the target area, the present invention actively attracts game by also promoting the desirability of the target area for other primal purposes, namely feeding.

The invention further improves upon the prior art by providing a method for easily placing the device in the target area without the need for permanent or otherwise complex structures to anchor it thereto. Thus, another advantage of the present invention is that it may be quickly deployed by the hunter without requiring the hunter to enter or submerge various body portions in the water, which is often quite frigid, when deploying the device. Since the device depends from floating decoys that are placed upon the upper surface of the water, the device may be deployed by simply coupling the selected decoys to the device and then lowering the device into the water.

The motion system includes a frame to which at least one decoy is secured. Preferably, multiple decoys are secured to the frame. The frame is then deployed beneath the surface of the water in the target area. The frame is thus suspended by the floating decoy or decoys beneath the surface.

In one exemplary embodiment, the frame forms a parallelepiped structure. The parallelepiped structure may have a square or rectangular or other type of parallagram cross-sectional outline. In another exemplary embodiment, the frame may form a collar with pivoting legs.

The frame also includes a mounting system for a motor. In one embodiment, the mounting system comprises an internal brace extending between opposite sidewalls. The brace may alternatively extend diagonally between opposing corners, or the brace may extend from a single sidewall. In another embodiment, the brace is formed by the frame itself. The brace may also be mounted externally to the frame.

The brace secures the motor to the frame. The motor may be fixed or mounted in a pivotal configuration. When fixed, the longitudinal axis of the motor is transverse to the horizontal plane established by the frame. When pivotable, the motor pivots between a position in alignment with the horizontal plane and transverse thereto. In another exemplary embodiment, the mounting system may include an integral collar that encircles the motor to affix it to the frame.

The motor includes a propeller and a controller. The controller may be either remote or hardwired to the motor. The controller enables the user to manipulate propeller activation.

When deployed, the frame resides beneath the surface of the water where it is suspended by the floating decoys. The user may selectively activate the motor using the controller. When the motor is activated, the propeller forces the frame downwardly to drag at least a portion of each supporting decoy beneath the surface of the water. This movement gives the appearance of feeding game. The movement also creates ripples that move adjacent decoys to simulate swimming movement.

In one embodiment, the device may be remotely actuated. In yet another embodiment, the device may be remotely actuated automatically for extended periods of time. In such a manner, the device may operate as an icing preventative for the area surrounding the target area.

A principle object of the present invention is to provide a system for animating decoys.

A related object of the present invention is to provide a system for animating a plurality of decoys simultaneously.

Another object of the present invention is to provide a system for attracting waterfowl and the like that simulates a primordial activity.

A related object of the present invention is to provide a decoy system that aggressively promotes the desirability of a target area.

Yet another object of the present invention is to provide a device that enables hunters to more effectively and efficiently hunt.

Another object of the present invention is to provide a method of attracting waterfowl to target areas.

A basic object of the present invention is to provide a system for animating decoys.

Another object of the present invention is to provide a suitable apparatus for remotely activating moving decoys.

BRIEF DESCRIPTION OF THE SEVERAL VIEWS OF THE DRAWING

FIG. 10 is a perspective view of another exemplary embodiment.

DETAILED DESCRIPTION OF THE INVENTION

Figure 1:
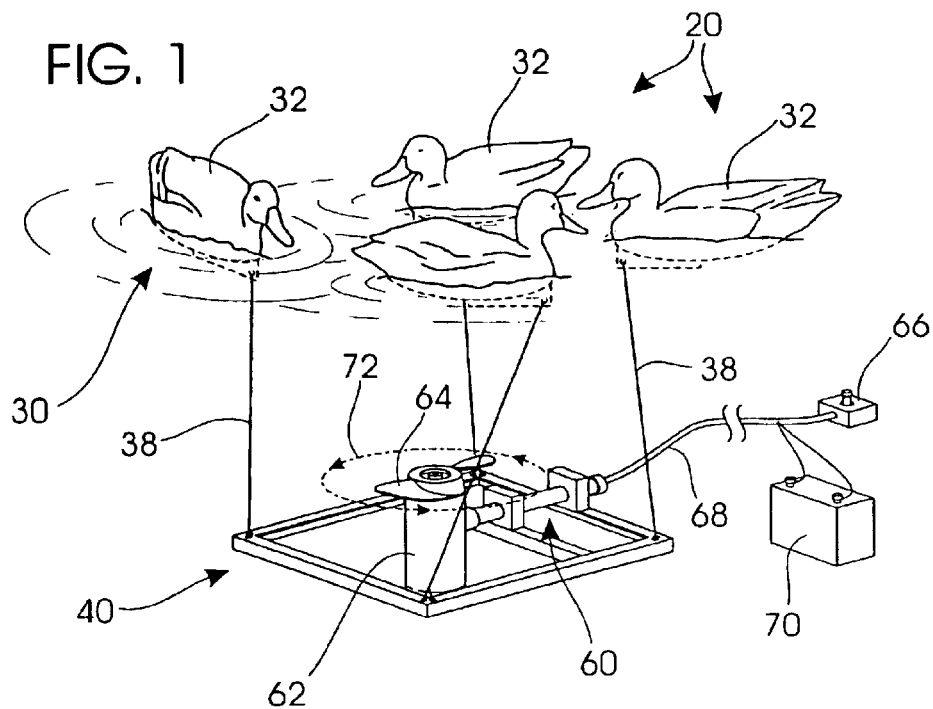
FIG. 1 is an environmental view of an exemplary embodiment of the motion system for decoys according to the invention.
Figure 2:
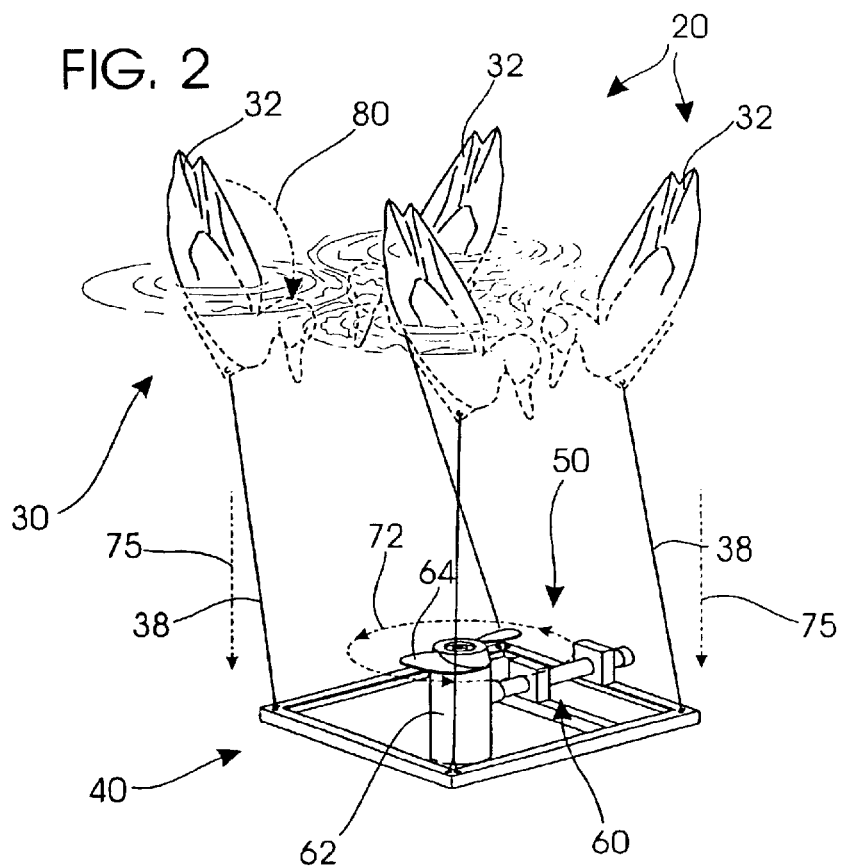
FIG. 2 is an environmental view showing the invention in use with multiple decoys with the dashed lines indicating a moved position thereof.
Figure 3:
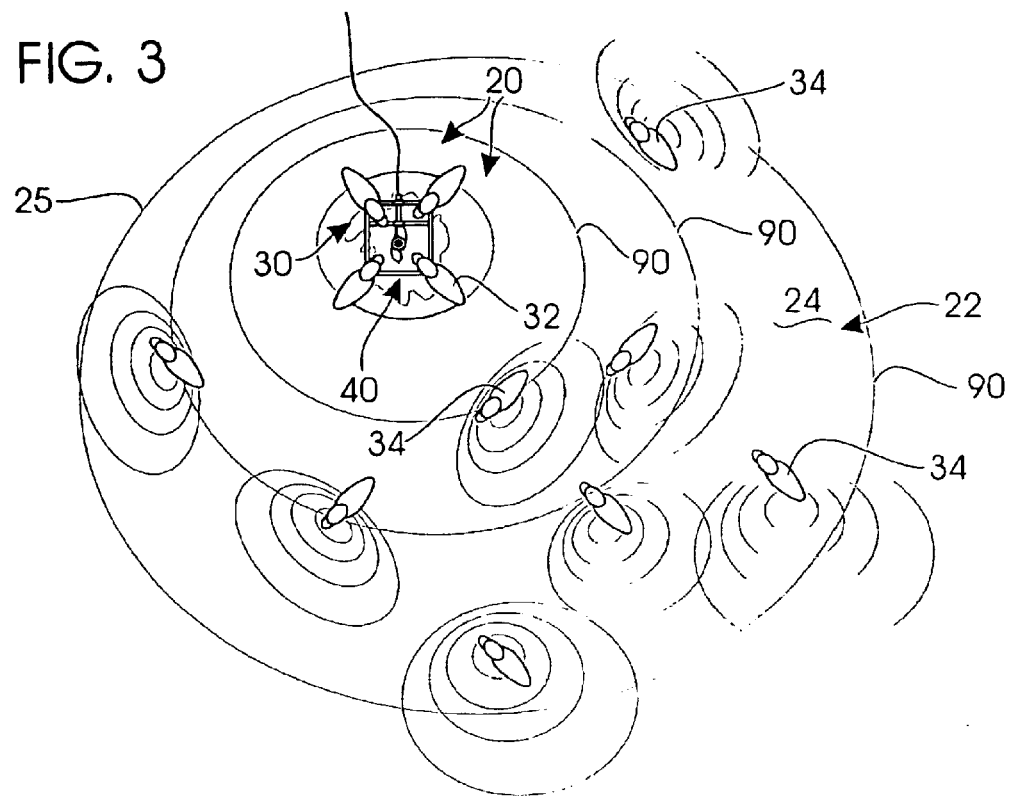
FIG. 3 is an overhead environmental view showing the invention and resulting water movement.
Figure 6:
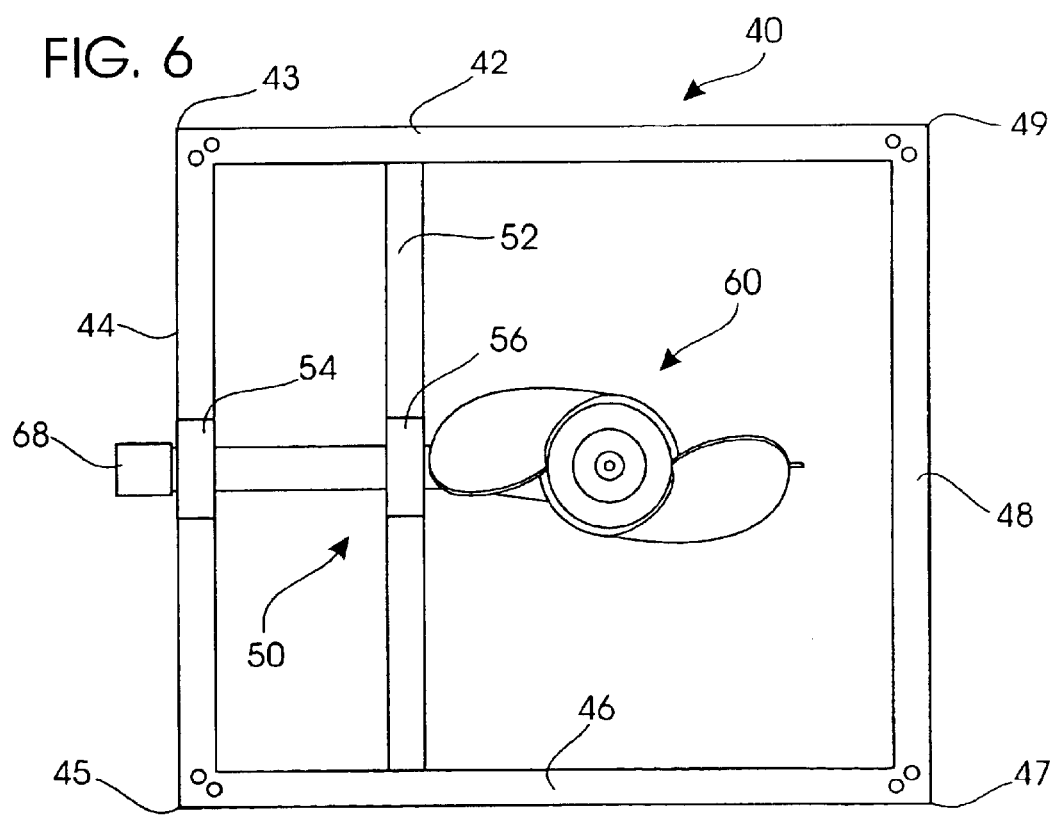
FIG. 6 is a top plan view thereof.
Figure 4:
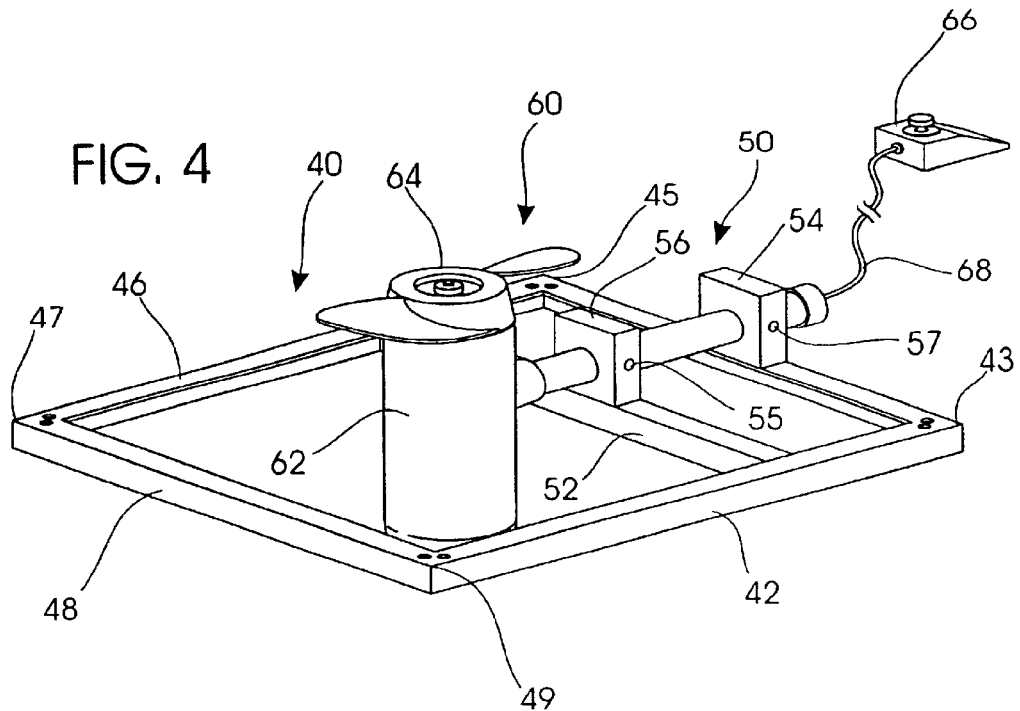
FIG. 4 is a perspective view thereof, taken from generally above the invention.
Figure 5:
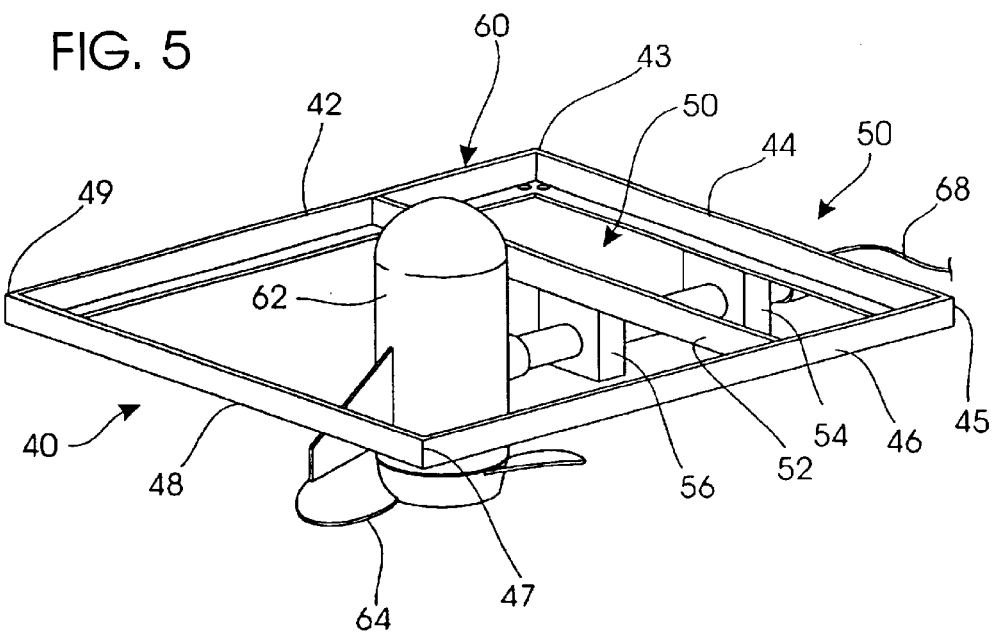
FIG. 5 is a perspective view thereof, taken from generally below the invention.
Figure 7:
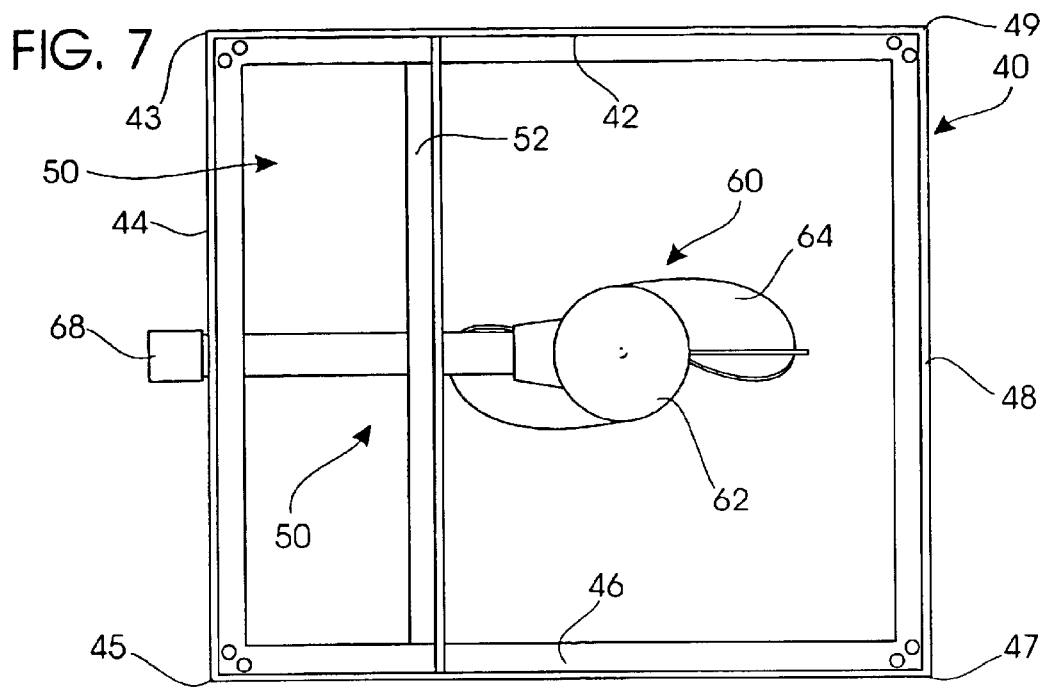
FIG. 7 is a bottom plan view thereof.
Figure 8:
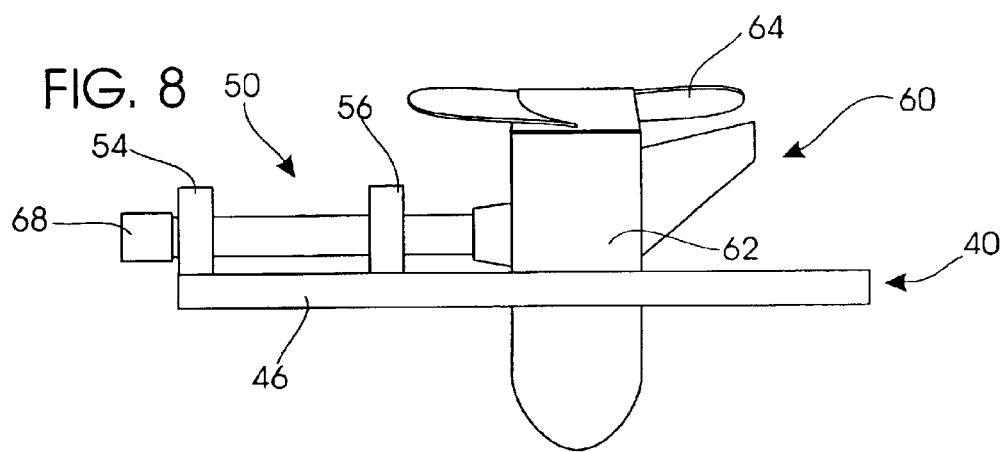
FIG. 8 is a side elevational view thereof.
Figure 9:
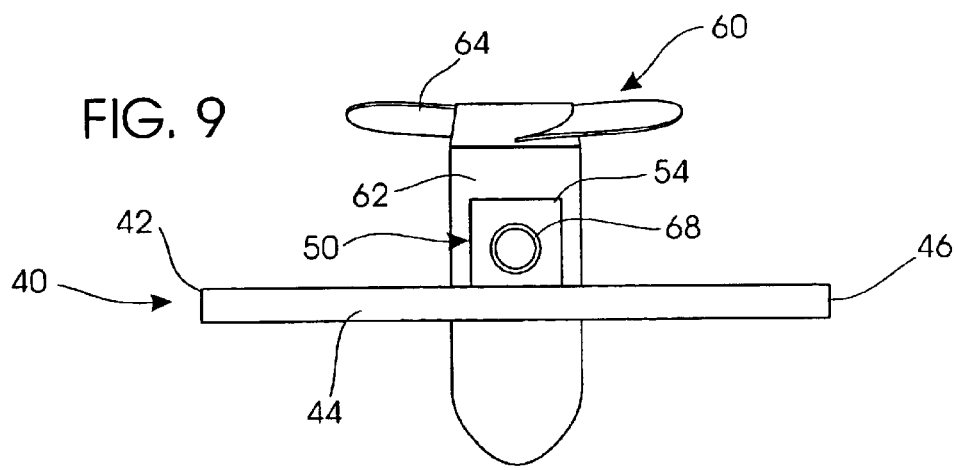
FIG. 9 is a front elevational view thereof.

The motion system for decoys is generally designated by reference numeral 20 in FIGS. 1–10. The motion system is adapted to animate several decoys simultaneously to attract waterfowl and the like.

The motion system 20 is deployed in a body of water 22 or the like. Ideally, at least a portion of the system 20 is suspended beneath the surface 24 of the body of water 22. The system 20 is deployed in a decoy spread 26. The decoy spread 26 is deployed in the vicinity of a conventional hunting blind.

The system 20 uses buoyant decoys 30 to suspend a frame 40 beneath the water surface 24. Each decoy 32 has a guide wire or string or rope 38 that extends from the decoy front 35 to support the frame 40 in a manner that will be described hereinafter. Each decoy 32 of the suspending decoys 30 comprises a conventional floating decoy of the type commercially available. Typically, other conventional decoys 34 are also scattered about the hunting area or target vicinity 25 to complete the spread 26.

The frame 40 is ideally suspended beneath the water surface 24 by the decoys 30. The frame 40 spaces each decoy 32 from the other decoys respectively. The frame 40 also mounts a movement system 60.

In one exemplary embodiment, the frame 40 may have a rectangular, square or parallelogram cross-sectional outline, or other type of parallelepiped structure. The frame 40 includes side walls 42, 44, 46, and 48 that abut one another. Thus, side wall 42 abuts side walls 44 and 48 and side wall 46 also abuts side walls 44 and 48 to form the aforementioned structure. (FIGS. 1–9)

In another exemplary embodiment, the frame forms a collar 41 that encircles the motor 60 (FIG. 10).

A decoy 32 is coupled at each corner 43, 45, 47 and 49, respectively. In one embodiment, a protruding ring at each corner 43, 45, 47 and 49 permits the attachment of guidelines 35. In another exemplary embodiment, a pair of spaced-apart holes in each corner 43,45, 47 and 49 piece permit the guideline to be inserted therethrough and coupled thereto. In another exemplary embodiment, the collar 41 has pivoting legs 51, 53, 55 and 57 to which each decoy 32 is attached.

In one exemplary embodiment, the side walls 42, 44, 46, and 48 are individual pieces of metal that are welded at the corners 43, 45, 47, and 49, respectively. In another contemplated embodiment, the side walls are formed from a unitary piece that is bent at three corners 43, 45, and 47 and then welded at corner 49. The holes through which guideline 38 passes may be punched in plates at the corners 43, 45, 47, and 49 or actually drilled into the respective side walls adjacent each corner.

When the suspending decoys 30 are secured to the frame 40, the frame 40 can float beneath the water surface 24. The frame 40 supports the motive system 60 via bracket 50.

Support bracket 50 comprises an elongated spar 52 spanning respective side walls 42 and 46. A trunnion 54 upon side wall 48 and a trunnion 56 upon spar 52 permit pivotal movement of the motive system 60. Respective set screws 55 and 57 secure the motive system 60 in the desired orientation. The set screws 55 and 57 permit the user to pivot the motor 60 between a storage or transport position and a deployed position.

Motive system 60 provides the motion to animate the suspending decoys 30 as well as adjacent decoys 34, as will be more thoroughly discussed hereinafter. The motive system 60 includes an engine 62 with an attached propeller 64. The engine 62 may be controlled by a remote control 66 attached via control line 68. The control line may also lead to a remote power source such as a battery 70. In the exemplary embodiment, motor 62 is a conventional trolling motor.

Ideally the motor 62 operates off of a 12-volt power source. In an exemplary embodiment, the motor may be set to run automatically at predetermined intervals (i.e. every two minutes or the like). In this manner, the system 20 may be used to prevent freezing of surface 24 adjacent decoys 30.

Operation

The motion system 20 enables a hunter to accurately simulate a primordial instinct to aggressively attract potential game or victims to a hunting site or target area 25. The system 20 simulates the feeding activity of several animals or ducks 30. The system successfully imitates this activity by dragging decoys 30 beneath the water surface 24. The system 20 drags the front section of each decoy 32 beneath the surface of the water 24 when the motor 62 is activated via remote control 66.

The activation of motor 60 forcefully rotates propeller 64 to provide thrust in the direction indicated by the arrows identified by reference numeral 70. The thrust of motor 62 and direction 70 forces frame 40 in the direction indicated by arrow 75. With collar 41, propeller activation also forces legs 51, 53, 55 and 57 in the direction of arrow 85. The movement of frame 40 in the direction 75 concurrently moves a decoy in a similar direction as indicated by arrow 80. If the decoys are coupled to the frame 40 by the guideline 38 adjacent the front end 33 of the decoy, the decoys pivot about the front end 33 to raise the rear portion 36 of each decoy out of the water while front end 33 plunges beneath the surface 24. The movement of the decoy 32 is indicated by arrow 80. This movement creates a substantial amount of splashed water while also moving the decoy to emulate a natural feeding position of ducks and other waterfowl.

The splashed water causes ripples 90 upon surface 24 which travel to surrounding decoys 34 to animate them as well. The ripples also prevent the formation of ice upon surface 24. Thus, the movement of system 20 also prevents icing of the hunting area.

In another exemplary embodiment, the invention includes a timer (not shown) that enables the hunter to leave the system 20 unattended while it continues periodically moving the plurality of decoys 30. For example, a hunter could leave the system activated at night to prevent the formation of ice about the hunting area or the like.

The invention further simulates the activity or the appearance of a significant amount of movement upon the surface of the water 24. The movement attracts game by simulating several fish splashing about or "boiling" the water and/or aggressive hunting and/or feeding behavior of waterfowl to further aid in attracting the game or victims.

The simulation of potential feed further heightens the desirability of the target area and provides added incentive for the victims to approach. The employment of the system 20 further increases the ability of the hunter to allay any suspicions of potential victims by relying upon two primordial instincts to attract the victims to the area. The first is the basic instinct of feeding and the second is the basic instinct of safety, which both work to the hunter's advantage with system 20.

Whereas, the present invention has been described in relation to the drawings attached hereto, it should be understood that other and further modifications, apart from those shown or suggested herein, may be made within the spirit and scope of this invention.

What is claimed is:

1. A method of attracting game to a pool of water comprising the steps of:

deploying a plurality of decoys on the pool;

selectively animating said plurality of decoys to attract said game, said animating simulating the feeding activity of a duck or goose or other waterfowl on water; and, wherein said animating step is performed by at least one floating decoy upon the pool supporting a frame adapted to be disposed beneath said decoy in the pool and wherein said frame is adapted to selectively animate said decoy in response to control signals from a user using a motor coupled to said frame and adapted to move said frame downwardly in response to said control signals, said frame movement causing said decoy to become animated to attract said game; and, wherein said frame comprises a collar and wherein said collar further comprises at least two legs pivotally coupled to said collar and wherein said each of said legs comprise an attachment means to secure said at least one floating decoy thereto.

2. A decoy animation system for attracting a desirable quarry and adapted to be used with a plurality of floating, water-borne decoys and deployed underwater beneath the floating decoys, said system comprising:

a frame selectively secured to the floating decoys and adapted to remain underwater;

a motor secured to said frame and adapted to be remotely actuable; and, control means for activating said motor to force said frame downwardly to cause the decoys to mimic feeding activities of the desirable quarry;

wherein said decoys mimic feeding activities of the desirable quarry by partially submerging; and, wherein said frame comprises a rigid structure.

* * * * *